May 13, 1947. A. J. HORNFECK 2,420,539
MEASURING AND CONTROLLING SYSTEM
Filed Aug. 3, 1942 4 Sheets-Sheet 1

Inventor
ANTHONY J. HORNFECK
By Raymond D. Junkins
Attorney

May 13, 1947.   A. J. HORNFECK   2,420,539
MEASURING AND CONTROLLING SYSTEM
Filed Aug. 3, 1942   4 Sheets-Sheet 2
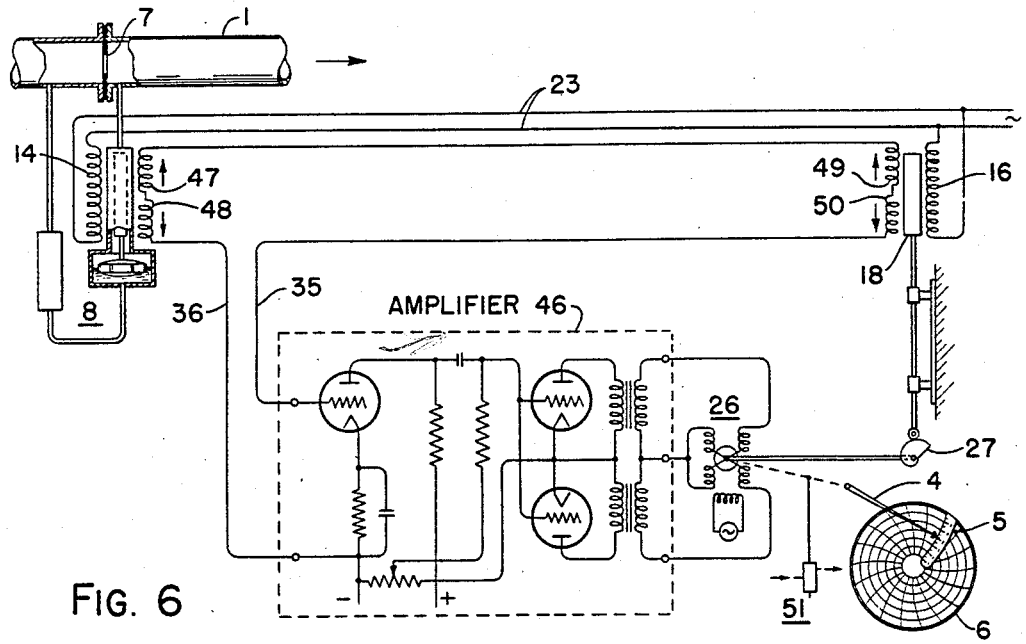
FIG. 6
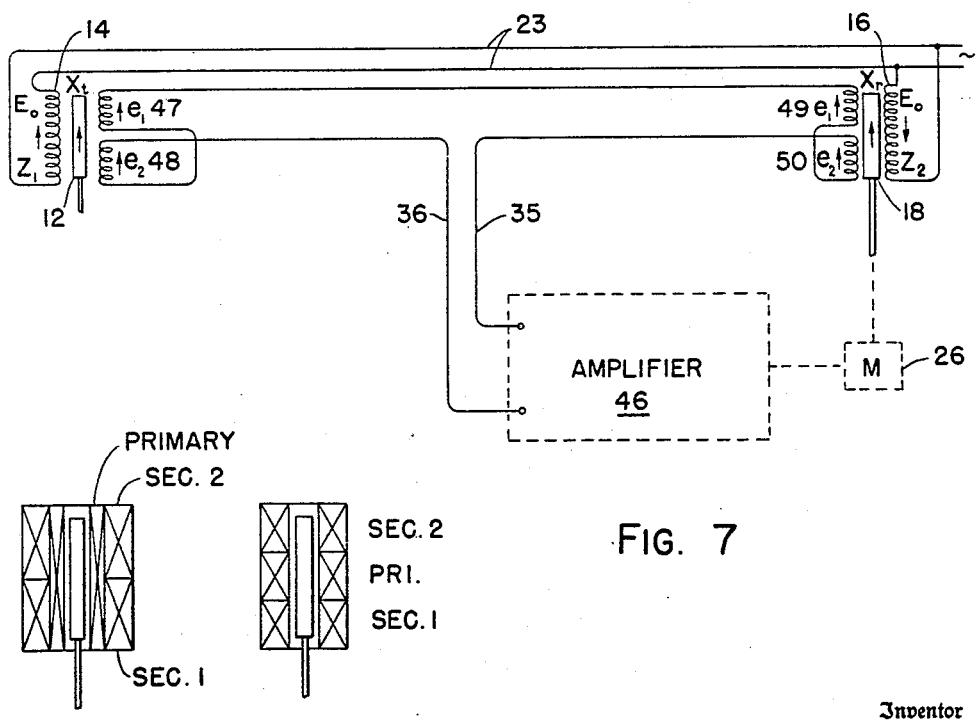
FIG. 7
FIG. 8   FIG. 9
Inventor
ANTHONY J. HORNFECK
By Raymond W. Jenkins
Attorney Inventor
ANTHONY J. HORNFECK Patented May 13, 1947

2,420,539

UNITED STATES PATENT OFFICE 2,420,539

MEASURING AND CONTROLLING SYSTEM

Anthony J. Hornfeck, Cleveland Heights, Ohio, assignor to Bailey Meter Company, a corporation of Delaware Application August 3, 1942, Serial No. 453,488

15 Claims. (Cl. 177—351)

This invention relates to telemetric control systems for producing an electrical effect in accordance with the difference between a plurality of variables. The effect may, for example, control suitable means for maintaining a dependent variable in correspondence with a master or independent variable. The variables may be the same or different. One of the variables, for example the independent variable, may be rate of flow of a fluid, humidity, temperature, pressure, electromotive force, or the like, while another of the variables, for example the dependent variable, may be the position of a member. In other cases the independent variable may be the position of a member and the dependent variable may be the rate of flow, humidity, temperature, pressure, electromotive force, or the like.

In accordance with my invention the magnetic coupling between a primary and a secondary coil is varied in correspondence with each variable, so that the voltages produced in each secondary coil correspond in magnitude to the magnitude of one of the variables. If the variables are equal or stand in predetermined proportion, the voltages induced in the several secondary coils are equal or balanced. If proper correspondence does not exist between the variables, then a voltage will exist between the secondary coils, which voltage will have a phase depending upon the sense of the departure of the variables from proper correspondence. The phase of the voltage determines the direction of operation of suitable electromagnetic means which may or may not be arranged to alter the value of one of the variables to maintain the same in proper correspondence with another of the variables. More particularly one or the other of a pair of electron discharge devices is rendered conducting selectively in accordance with the phase of the voltage between the secondary coils and the electron discharge devices in turn control the starting, stopping and direction of movement of suitable electromagnetic means, such for example as a motor.

In the drawing:

Fig. 6 is a somewhat diagrammatic showing of a remotely recording fluid rate of flow meter including the basic improvement of the present invention.

Fig. 7 is a schematic circuit drawing in simplification of Fig. 6 and with slight modification thereover.

Figs. 8 and 9 are suggested constructions of three-coil inductor units, such as the transmitter or the receiver of Figs. 6 and 7.

Figure 13:
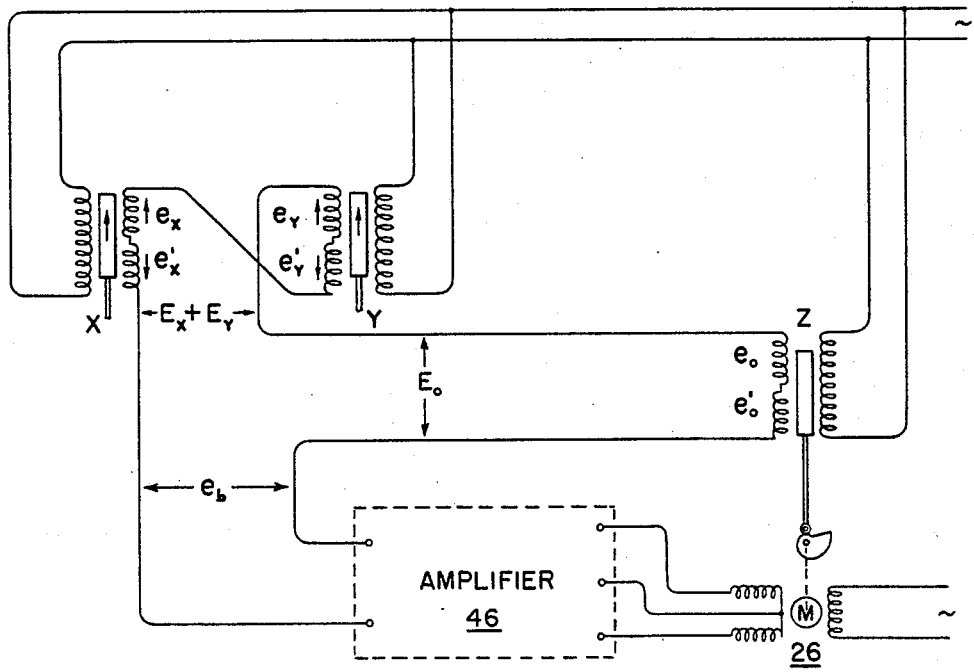

Fig. 13 diagrammatically illustrates a totalizer utilizing the three-coil inductor circuit.

Figure 14:
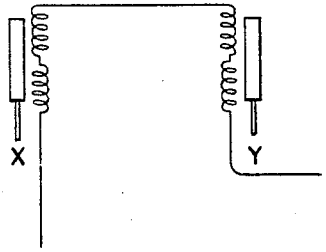

Fig. 14 is a portion of Fig. 13 showing the circuit changes necessary to obtain the difference between two variables as distinguished from Fig. 13 which obtains the summation of the two variables.

Figure 15:
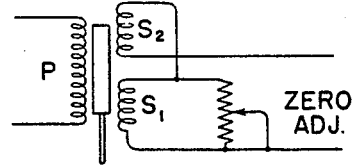

Fig. 15 is a portion of the previous figures indicating in detail a zero adjustment.

As a specific embodiment, I have illustrated my invention in the drawing as adapted to telemeter the magnitude of a variable, specifically rate of fluid flow, from a remote or transmitting station to a local or receiving station. It is evident that in this embodiment rate of flow or position of the transmitting member positioned in accordance therewith may be considered as the independent variable, and the position of the exhibiting or receiving member as the dependent variable. Lack of correspondence between the independent and dependent variables sets up a voltage which, through suitable relay means, acts to vary the magnitude of the dependent variable until proper correspondence is restored.

There is provided, both at the transmitter and receiver stations, magnetically coupled primary and secondary coils or windings. The magnetic coupling between the transmitter primary and secondary coils is varied in correspondence with changes in the independent variable, and hence the voltage in the transmitter secondary coil or coils will be proportional to the magnitude of the independent variable. The magnetic coupling between the receiver primary and secondary coils is varied in correspondence with changes in the dependent variable, in the specific embodiment described the position of the exhibiting means, and hence the voltage in the receiver secondary coil or coils will be proportional to the magnitude of the dependent variable. If the position of the exhibiting means properly correspond to the then existing rate of fluid flow, the voltages in the transmitter and receiver secondary coils will be equal. If such correspondence does not exist, then the voltages will not be equal and a voltage will exist between the transmitter and the receiver secondary coils. This latter voltage will be of one phase if the lack of correspondence is in one sense and of opposite phase if the lack of correspondence is in opposite sense. As, for example, the arrangement may be such that upon an increase in the rate of flow a proportionate increase in the voltage in the transmitter secondary coil will result, so that the voltage between the transmitter and receiver secondary coils will be of one phase; and upon a decrease in the rate of flow a proportionate decrease in the voltage induced in the transmitter secondary coil will result, so that the voltage between the transmitter and receiver secondary coils will be of opposite phase. The phase of the voltage causes selective operation of suitable electromagnetic means for altering the position of the exhibiting means to restore the same to proper correspondence with the rate of flow.

Figure 1:
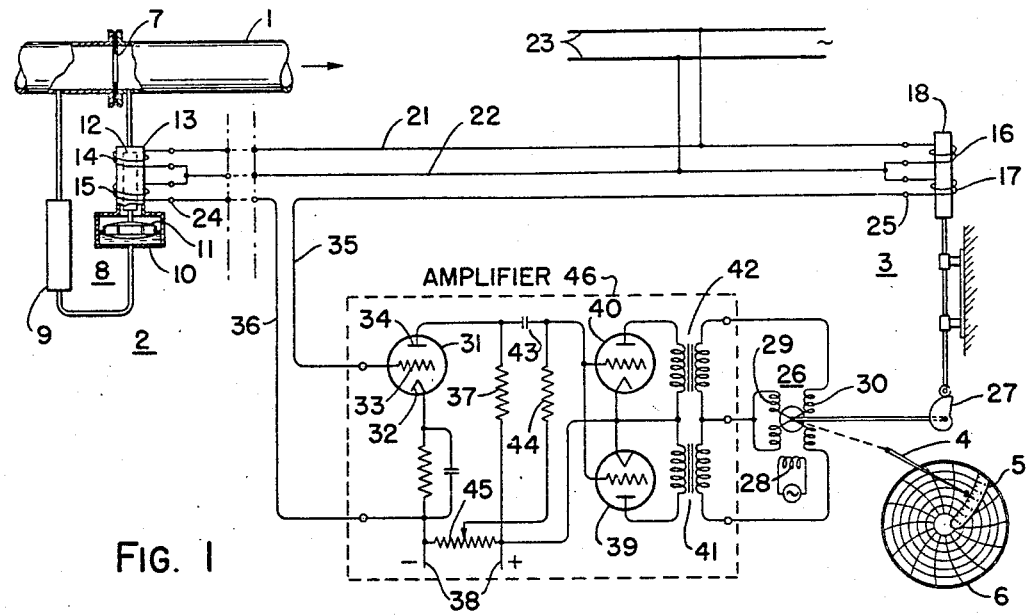
Fig. 1 is a duplicate of Fig. 1 of my copending application Serial No. 325,630 entitled Telemetric control systems, now Patent No. 2,330,427, of which the present application is a continuation-in-part.

Referring now to Fig. 1, I therein illustrate my invention as adapted to telemeter the rate of fluid flow through a conduit 1 located adjacent a transmitting station generally indicated at 2 to a receiver station generally indicated at 3. In the receiver station is an exhibiting means specifically illustrated as a movable index 4 adapted to indicate relative to a suitably graduated scale 5 and to record on a rotatable chart 6 the rate of fluid flow through the conduit 1. The chart 6 may be rotated by any suitable clock mechanism (not shown).

Positioned in the conduit 1 is a restriction, such as an orifice 7, for producing a differential pressure varying in functional relation to the rate of fluid flow. Connected across the orifice is a U-tube 8 having legs 9 and 10 in which is a suitable sealing liquid, such as mercury, which will be displaced from one leg to the other until the difference in height in the two legs corresponds to the differential pressure produced by the orifice 7. Disposed in the leg 10 is a float 11 vertically positioned in response to changes in the height of mercury in the leg. Carried by the float 11 is a core piece 12 fabricated of a magnetic material, preferably a silicon iron which may be laminated to minimize eddy currents.

The core piece 12 is enclosed in a pressure tight cylindrical housing or casing 13 made of a non-magnetic material, such as brass or a so-called stainless steel, usually being a metallic alloy containing substantial amounts of nickel and chromium.

Surrounding the casing 10 is a primary coil 14 magnetically coupled by the core piece 12 to a secondary coil 15. In the receiver 3 is a corresponding pair of windings comprising a primary coil 16 magnetically coupled to a secondary coil 17 by a core piece 18. The primary coils 14 and 16 are connected by conductors 21 and 22 to a suitable source of alternating current 23. The conductor 22 also serves as a common lead between the primary and secondary coils and interconnects corresponding ends of the secondary coils 15 and 17. Movements of the core piece 12 cause corresponding variations in the voltage induced in the secondary coil 15 from the primary coil 14. Accordingly, the potential effective at the terminal 24 of the secondary coil 15 will be proportional to the position of the float 11 or to the rate of fluid flow through the conduit 1. Similarly, the voltage induced in the secondary coil 17 from the primary coil 16 will vary in correspondence with the changes in position of the core piece 18. Accordingly, the potential effective at the terminal 25 of the secondary coil 15 will be proportional to the position of the core piece 18.

If equal potentials exist at the terminals 24 and 25 then the position of the core piece 12 may be said to correspond with that of the core piece 18. However, a change in position of the core piece 12 will, if in one direction, cause a voltage of one phase to exist between the terminals 24 and 25; and of the opposite phase if the core piece 12 changes in position in opposite direction. Such voltage existing between the terminals 24 and 25, through suitable amplifying and relay means hereinafter to be described, selectively operates a motor 26 in one direction or the other in accordance with the phase of the voltage. As shown, the motor 26 is employed both to position the index 4, and the core piece 18 through a suitable cam 27. The direction of operation of the motor 26 is such that the core piece 18 is moved toward correspondence with the position of the core piece 12, and when such correspondence is obtained the potentials at the terminals 24 and 25 will again be equal or balanced.

Assume, for example, that at some rate of flow through the conduit 1 the voltage induced in the coil 15 is equal to that induced in the coil 17. Then upon an increase in flow from the assumed value the voltage induced in the coil 15 will be greater than that induced in the coil 17. This will cause a voltage of predetermined phase to exist between the terminals 24 and 25. Assuming on the other hand a decrease in flow from the assumed value, a voltage of opposite phase will exist between the terminals 24 and 25. Under the first condition, the motor 26 is caused to operate in direction to move the core piece 18 to increase the magnetic coupling between coils 16 and 17 until the voltage induced in the coil 17 is again equal to that induced in the coil 15. Under the second condition, the motor 26 is caused to operate in opposite direction to position the core piece 18 to decrease the magnetic coupling between the coils 16 and 17 until the voltage induced in the coil 17 is again equal to that induced in the coil 15. The position of the motor 26 and any of the elements positioned thereby thus becomes a measure of the rate of fluid flow through the conduit 1.

The motor 26 is shown as being of the type having a field winding 28 energized from a suitable source of alternating current, such as the source 23, and with opposed shading pole windings 29 and 30. When the windings 29 and 30 are open circuited or are both effectively short circuited, the motor 26 remains stationary. When the pole winding 29 is effectively energized, as by being short circuited, the motor 26 will rotate in one direction, and when the winding 30 is effectively energized by being short circuited, the motor 26 will rotate in opposite direction.

In order that a voltage of one phase between the terminals 24 and 25 will cause, for example, effective short circuiting of the pole winding 29, and a voltage of reverse phase will cause effective short circuiting of the winding 30 I employ an amplifying and control circuit forming the subject matter of Patent 2,275,317 to John D. Ryder.

The voltage existing between the terminals 24 and 25 is first amplified by means of an electron discharge device 31 having a cathode 32, a grid 33 and a plate 34. The voltage between the terminals 24 and 25 controls the potential relationship between the cathode 32 and grid 33, for as shown the terminal 25 is connected by means of a conductor 35 to the grid 33, whereas the terminal 24 is connected by means of a conductor 36 to the cathode 32. The plate circuit of the electron discharge device 31 includes a resistance 37 and a source of direct current 38. When the potential difference between the terminals 24 and 25 is zero a direct current may or may not pass through the plate circuit of the device 31, depending upon the electrical characteristics of the device and the bias of the grid 33.

An alternating current voltage between the terminals 24 and 25 superimposes upon the normal grid bias of the device 31 a pulsating control potential which causes the current in the output circuit of the device 31 to become similarly pulsating in character. The amplitude of the pulsations in the output circuit of the device 31 will depend upon the difference in potential of the terminals 24 and 25, and the phase of the pulsations will depend upon whether the potential at the terminal 24 is greater or lesser than that at the terminal 25.

The pulsating current passing through the output circuit of the device 31 is utilized to control the current transmission through a second pair of electron discharge devices 39 and 40, the output circuits of which are inductively coupled through transformers 41 and 42 to the circuits of the pole windings 29 and 30 respectively. Such direct current as may normally flow through the output circuit of the device 31 will have no effect upon the potential impressed upon the grids of the devices 39 and 40, by virtue of a condenser 43. Upon an alternating current voltage existing between the terminals 24 and 25 however, the pulsating component of the current in the output circuit of the device 31 will pass through the condenser 43 and render either the device 39 or the device 40 conducting selectively in accordance with the phase of the voltage between the terminals 24 and 25.

Such selective control of the devices 39 and 40 is obtained by arranging them to have opposite polarity. That is, when the anode of the device 39 is positive, the anode of the device 40 is negative, and vice versa. As hereinbefore stated, the phase of the pulsating current in the output circuit of the device 31 will depend upon whether the potential of the terminal 24 is greater or lesser than at the terminal 25. Accordingly, upon the potential at the terminal 24 being greater than that at the terminal 25, pulsating current in the output circuit of the device 31 may render, for example, the grid of the device 39 more positive with respect to its cathode during the same half cycle that its anode is positive and hence the device will be rendered conducting. Conversely, if the potential of the terminal 24 is less than that of the terminal 25, the pulsating current in the output circuit of the device 31 will be in phase with the plate potential of the device 40, and hence will render the grid thereof more positive with respect to its cathode during the same half cycle that its anode is positive, so that the device will be rendered conducting.

When either the device 39 or 40 is rendered conducting, thereby effectively short circuiting the secondary of the transformer 41 or 42 respectively, the impedance of the circuit of the pole winding 29 or 30 is sufficiently reduced to effect rotation of the motor 26 in one direction or the other. Such rotation, as heretofore described, positions the index 4 relative to the scale 5 and chart 6, and simultaneously positions the core piece 18 relative to the coils 16 and 17 to again make the potential induced in the coil 17 equal to that induced in the coil 15 and bring the system to a null or balanced condition.

The devices 39 and 40 may normally be maintained non-conducting by connecting their grids through a resistance 44 to a suitable point on a voltage divider 45 spanning the source 38. To provide a high degree of sensitivity, in some cases it may be desirable to maintain the pole windings 29 and 30 normally energized a predetermined amount. This may be accomplished by maintaining the electron discharge devices 39 and 40 conducting, which may also be accomplished by connecting their grids to a suitable point on the divider 45. In the latter case the pulsating current originating due to a difference in potential between the terminals 24 and 25 will selectively render one or the other of the devices 39 or 40 more conducting than it was previously, and the other less conducting than it was previously, both from a condition of normally being somewhat conducting.

As known, the differential pressure produced by a restriction, such as the orifice 7, varies in non-linear relation to the rate of fluid flow through the conduit. As it is usually desirable to have the exhibiting mechanism, such as the index 4, positioned in linear relation to rate of fluid flow rather than to differential pressure, it is necessary to provide a means for extracting the non-linear functional relationship existing between differential pressure and rate of fluid flow. The cam 27 provides a convenient means for accomplishing this, for by proper shaping of the cam the movement of the index 4 relative to that of the core piece 18 in restoring the voltages induced in the coils 15 and 17 to equality, may be made such that the index 4 will be positioned in linear proportion to changes in rate of fluid flow. While in the embodiment of my invention shown in Fig. 1 the cam 27 may be properly shaped to extract the non-linear functional relation existing between differential pressure and rate of fluid flow, it will be evident that when the system is employed to exhibit or control the magnitude of other variables, the cam 27 may be shaped as may be found necessary, so that the index 4 will be positioned in linear proportion to changes in the magnitude of the particular variable under consideration, or in any desired relationship thereto.

In Fig. 1 I have shown an embodiment of my invention wherein the coils 14, 15 and 16, 17 are magnetically coupled by means of core pieces 12 and 18 respectively positionable along straight lines between definite limits. The positioning of the core piece 12 is in accordance with the fluid flow through the conduit 1. It will be understood that a transmitter core piece, such as 12, may be positioned through the agency of a pressure responsive Bourdon tube, through the agency of a temperature system, or by any desired variable or position which is to be remotely transmitted to a receiver.

Figure 2:
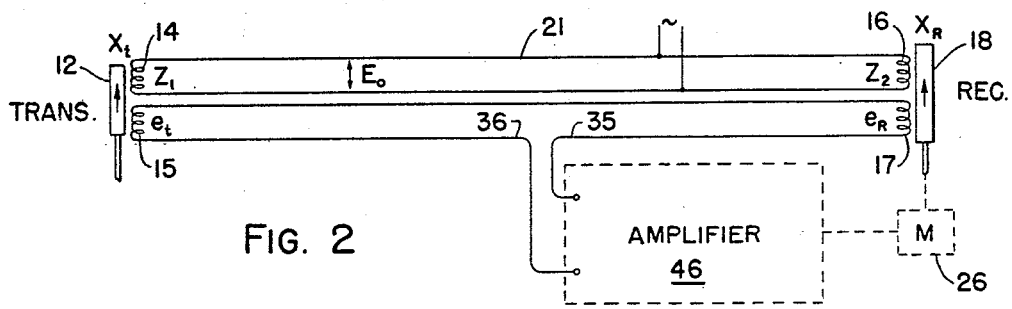
Fig. 2 is an elementary circuit diagram of magnetically coupled primary and secondary loop circuits, and in which the electronic amplifier and motor control has been indicated and labeled.

In Fig. 2 I show an elementary diagram, the primary loop circuit including the transmitter winding 14 and the receiver winding 16, energized across the alternating current source 23. I show the secondary loop circuit including the transmitter winding 15 and the receiver winding 17, as well as the amplifier-motor control 46. The amplifier 46 is illustrated in dotted line with reference to Fig. 1, and in the simplified circuits to be discussed hereinafter will be referred to as the amplifier 46 without further detail.

In Fig. 2 the primary loop circuit is magnetically coupled to the secondary loop circuit at the transmitter by the core 12 and at the receiver by the core 18. The system is not the usual induction bridge circuit. A magnetically coupled primary and secondary winding is located at the transmitter and a similar one at the receiver. Lack of correspondence between the position of the cores 12 and 18, representative respectively of the independent variable and the dependent variable, sets up a voltage in the secondary loop circuit, the phase of which depends upon the sense of the voltage and therefore of the lack of correspondence. The amplifier 46 is phase sensitive and controls the motor 26 to position the core 18 until the cores 12 and 18 are again in correspondence, the voltage between the secondaries 15 and 17 is balanced and the phase relation in the secondary loop circuit is null.

Figure 3:
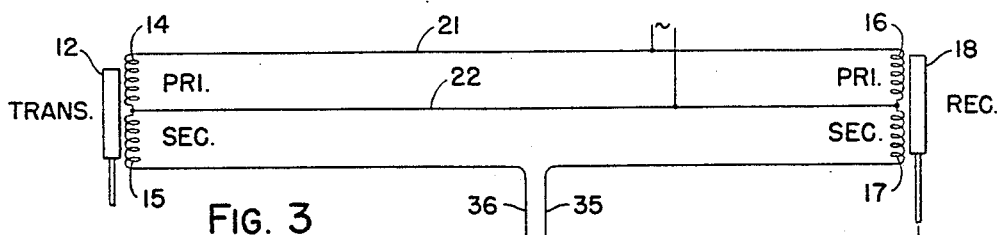
Fig. 3 is a simplified diagram of the complete circuit of Fig. 1.

Fig. 3 is a simplified circuit, similar to Fig. 2 except that a common conductor is utilized for the primary and secondary loop circuits. Thus the conductor 22 is included in both of the loop circuits. The showing of Fig. 3 is merely a simplified diagram of the more complete circuit explained as to Fig. 1.

Figures 4, 5:
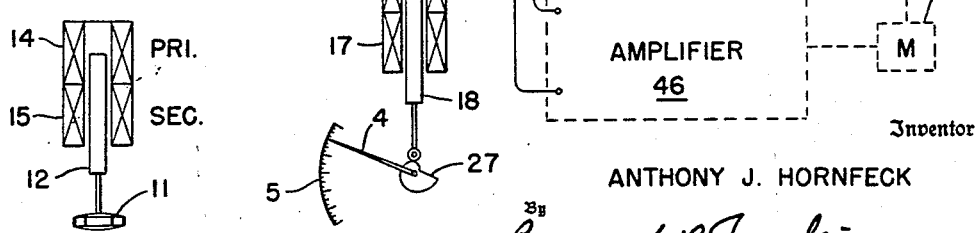
Fig. 4 is a two-coil inductor unit, such as the transmitter of Fig. 1.
Fig. 5 is a two-coil inductor unit, such as the receiver of Fig. 1.

In Figs. 4 and 5 I illustrate a preferred construction of inductors, such as may be used at the transmitter 2 and the receiver 3. The relative location of the primary and secondary windings depends upon desired direction of movement of the core-pieces 12 and 18.

Considering the basic circuit illustrated in Fig. 2, having a two-coil inductor solenoid at the transmitter and a similar inductor solenoid at the receiver, I have found the sensitivity in the system to be good, but the system to be slightly less accurate and slightly less stable than could be desired. This arises partly from the fact that there is a large induced voltage in the secondary coil of the inductor even when the magnetic core is in its minimum position. Consequently if there is a slight difference between the primary coil impedance of the transmitter and receiver units caused by a temperature difference, for example, the zero position of the receiver core will be in error. This effect is apparent from the following approximate analysis:

Let $E_0$ = applied primary voltage.
$Z$ = primary impedance.
$e_t$ = induced voltage—transmitter.
$e_r$ = induced voltage—receiver.
$X$ = core position—(fraction of total).
$M_0$ = initial mutual reactance ($X=0$).
$\Delta M$ = increase in mutual reactance from $X=0$ to $X=1$.

First let it be assumed that transmitter and receiver are identical and at the same temperature.

Then $Z_1 = Z_2$ and $$e_t = \frac{E_0}{Z_1}(M_0 + \Delta M X_t) \quad (1)$$

$$e_r = \frac{E_0}{Z_2}(M_0 + \Delta M X_r) \quad (2)$$

At balance
$$e_t = e_r$$
So that
$$X_1 = X_2$$

Now assume that $Z_1$ became slightly larger than $Z_2$ due to a rise in temperature.

Then when
$$e_t = e_r$$

$$\frac{E_0}{Z_1}(M_0 + \Delta M X_t) = \frac{E_0}{Z_2}(M_0 + \Delta M X_r) \quad (3)$$

$$X_r = \frac{Z_2}{Z_1}X_t - \frac{M_0}{\Delta M}\left(1 - \frac{Z_2}{Z_1}\right) \quad (4)$$

The error in receiver core position is $$X_t - X_r = \left(1 - \frac{Z_2}{Z_1}\right)\left(X_t + \frac{M_0}{\Delta M}\right) \quad (5)$$

At $X_t = 0$, the receiver core will be out of position by the amount $$\frac{M_0}{\Delta M}\left(1 - \frac{Z_2}{Z_1}\right) \quad (6)$$

expressed as a fraction of the total stroke.

If $M_0$ is large compared to $\Delta M$, this zero or low scale error may be appreciable, particularly if the system is used to meter a fluid flow.

If $M_0$ is about equal to $\Delta M$ the constant error defined by (5) will be about equal to the proportional error $$\left(1 - \frac{Z_2}{Z_1}\right) \text{ at } X_t = 1$$

From this analysis it can be seen that the accuracy of the system can be considerably improved by making the secondary voltage equal zero at the initial core position. This can be done by employing two secondary coils on the inductor solenoid and connecting them in series "bucking." This results in an inductor solenoid having three windings which may be assembled as indicated for example in Fig. 8 or Fig. 9.

I have diagrammatically indicated such a simplified circuit in Fig. 7, wherein the primary windings 14 and 16 are connected in parallel across the source of alternating current 23. Assuming that the magnetic core begins its stroke at the center of the inductor the induced voltages in the transmitter secondary coils are approximately—

$$e_1 = \frac{E_0}{Z_1}(M_0 + \Delta M X_t) \quad (7)$$

$$e_2 = \frac{E_0}{Z_1}(M_0 - \Delta M X_t) \quad (8)$$

and for the receiver coils $$e_1' = \frac{E_0}{Z_2}(M_0 + \Delta M X_r) \quad (9)$$

$$e_2' = \frac{E_0}{Z_2}(M_0 - \Delta M X_r) \quad (10)$$

When the system is balanced
$$(e_1 - e_2) = (e_1' - e_2')$$
and
$$2\frac{E_0}{Z_1}\Delta M X_t = 2\frac{E_0}{Z_2}\Delta M X_0 \quad (11)$$

$$X_r = \frac{Z_2}{Z_1}X_t \quad (12)$$

The error will now be proportional to the scale reading going from 0 to ($X_t=0$) to a maximum value of $$\left(1-\frac{Z_2}{Z_1}\right) \text{ at } (X_t=1)$$

The constant error due to $M_0$ is thereby eliminated.

The three-coil inductors may be constructed in several ways, as are for example illustrated in Figs. 8 and 9. In these figures the secondary coils are shown to be identical, in which case the zero position of the core would be at the exact center of the solenoid. However, the zero position can be biased to one end of the solenoid by making one secondary coil small relative to the other. An adjustable high resistance connected across one or both secondaries can be used for zero adjustment and calibration. This is illustrated in Fig. 15.

I have described in some detail the comparison of a two-coil inductor (Fig. 2) and the three-coil inductor (Fig. 7) because the improved accuracy and operation of the three-coil inductor constitutes a primary part of the present improvement in my invention.

Fig. 6 more or less duplicates the showing of Fig. 1 but utilizes the three-coil inductor at the transmitter and at the receiver schematically shown in Fig. 7. In Fig. 6 I additionally show that the motor 26 may position the movable element of a pilot valve 51 to establish an air loading pressure representative of the reading of the index 4 and thereby of the fluid rate of flow. Such a loading pressure may be utilized in controlling the rate of flow through the conduit 1 or in controlling other values or quantities.

Figure 10:
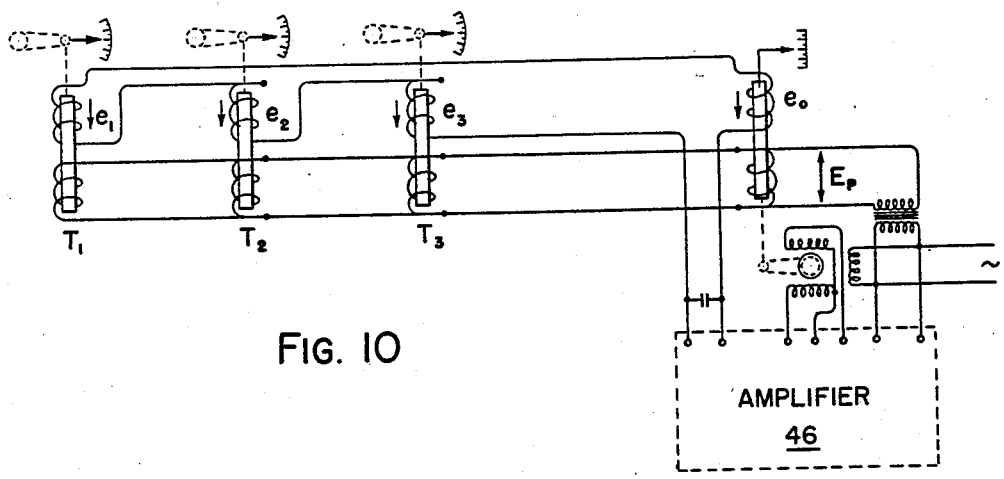
Figs. 10, 11 and 12 are schematic showings of the invention incorporated in a totalizer of two or more transmitters to a single receiver.

This system is particularly adapted to adding, subtracting or averaging with either the two-coil or the three-coil inductors at the transmitter and the receiver. Fig. 10 diagrammatically illustrates a totalizer wherein three transmitter positions $T_1$, $T_2$ and $T_3$ are added and the total is indicated at a single receiver. The inductor solenoids are indicated as of the two-coil type previously described in connection with Fig. 2. They are connected in such a way that their secondary voltages are added. Thus the primary windings are connected in parallel across the alternating current source $E_p$ while the secondary windings $e_1$, $e_2$ and $e_3$ are connected in series in a loop which also included secondary winding $e_0$ of the receiver inductor. The sum of the three transmitter secondaries is balanced against the secondary voltage of the single receiver, and the voltage input to the amplifier 46 is the difference between the receiver voltage and the sum of the transmitter voltages. Hence the amplifier will cause the reversing motor to move the receiver core to a position which will balance the system. If the secondary voltage of the inductor units is a linear function of core position, the receiver core will move in accordance with the sum of the motions of the transmitter cores. This may be shown by the following approximate analysis:

In a totalizing system having two transmitters let it be assumed that—

(1) The transmitting solenoids are identical.
(2) The cores of the transmitting units start from the same position relative to their respective coils and also have the same travel.

Then $$e_1 = e_{0t} + (\Delta e_t)X_1 \quad (13)$$
$$e_2 = e_{0t} + (\Delta e_t)X_2 \quad (14)$$
$$e_r = e_{0r} + (\Delta e_r)X_r \quad (15)$$

Where $e_1$ and $e_2$ = respective secondary voltages for two transmitters.
$X_1$ and $X_2$ = respective core motions of two transmitters measured from the same zero point.
$e_r$ = receiver secondary voltage.
$X_r$ = receiver core travel.
$e_0$ = induced voltage in solenoid secondary where $X=0$.
$\Delta e$ = rate of increase of induced voltage with core travel from ($X=0$) to ($X=1$).

When the system is balanced $$e_r = e_1 + e_2 \quad (16)$$

By substituting (13), (14) and (15) in (16) and solving for $X_r$ I obtain, $$X_r = \frac{2e_{0t} - e_{0r}}{\Delta e_r} + \frac{\Delta e_t}{\Delta e_r}(X_1 + X_2) \quad (17)$$

or in simplified form $$X_r = a \text{ constant} + K(X_1 + X_2) \quad (18)$$

if the receiver inductor is constructed so that $$e_{0r} = 2e_{0t}$$

and $$e_r = (\Delta e_t)$$

then $$X_r = X_1 + X_2 \quad (19)$$

Figure 11:
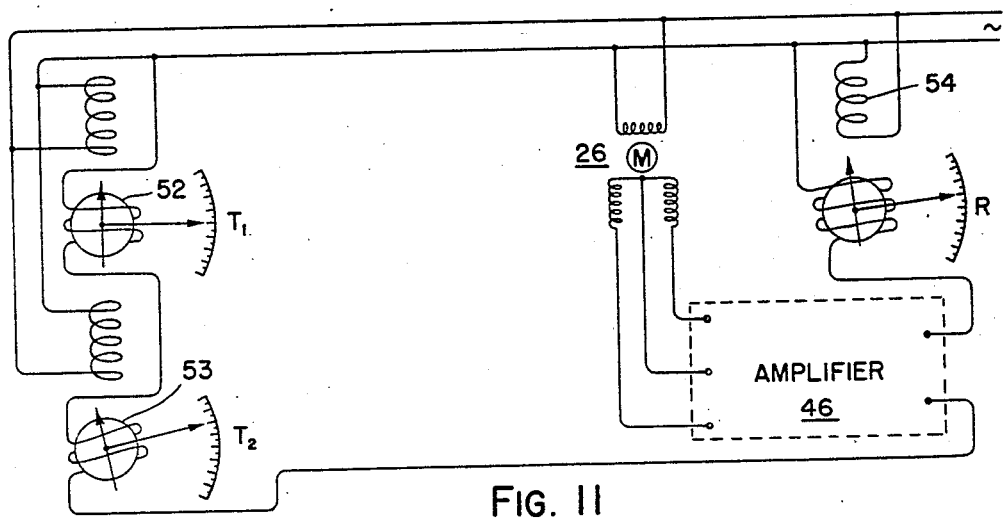

In Figs. 1 to 10 inclusive I have shown an embodiment of my invention wherein the stationary coils are magnetically coupled by means of a movable core piece. In Fig. 11 I show schematically a modified form of my invention wherein the secondary coils are inductively wound on angularly displaceable rotor elements 52 and 53 respectively. The primary coils of the transmitters $T_1$ and $T_2$ are connected in parallel across the source of alternating current and are individually wound about the salient pole pieces of the stator elements in relation to the rotors 52 and 53 respectively. Similarly the primary winding 54 in the totalizer receiver is wound about the salient pole pieces of a stator element at the receiver.

The rotor elements 52 and 53 of the transmitters $T_1$ and $T_2$ may be positioned through any suitable means in accordance with changes in the magnitude of the independent variables which are to be totalized at the receiver. Each of the transmitters, as well as the receiver, is equipped with an indicator and scale to visually advise the position of the rotors relative to the stators. The position of the rotors 52 and 53 is each representative of the value of an independent variable which may be a quantity, a quality or a position. The position of the rotor of the receiver is in accordance with the total or summation of the two transmitter positions.

Considering either the transmitter $T_1$, the transmitter $T_2$, or the receiver, the voltage induced in the secondary coil on the rotor from the primary coil on the stator will vary in accordance with changes in the position of the rotor element relative to the stator element. Likewise the voltage induced in the rotor element of the receiver will be the summation of the voltages induced in the stators $T_1$ and $T_2$ so that the receiver will indicate the summation or total of the positions of the transmitters $T_1$ and $T_2$.

Figure 12:
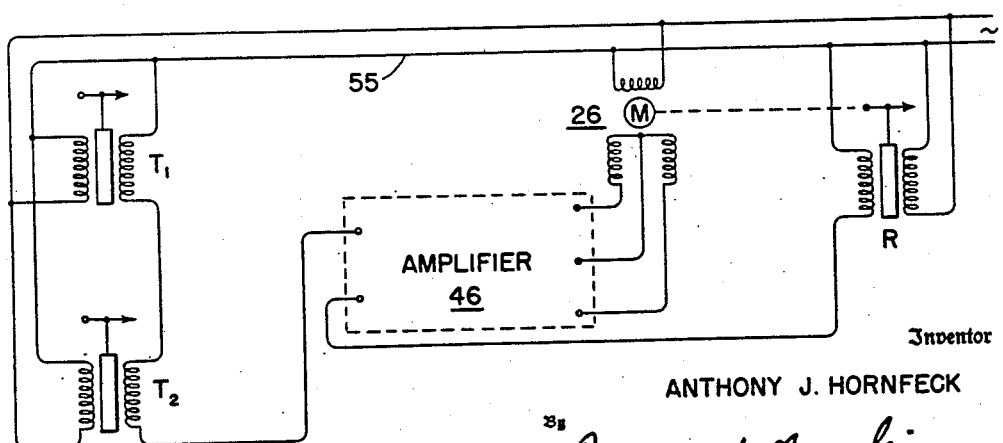

Fig. 12 is a totalizing system somewhat similar to the arrangement of Fig. 10, but wherein a common conductor 55 is used for both the primary and secondary loop circuits. The position, and therefore the induced voltages of the transmitters $T_1$ and $T_2$ are totalized in the voltage and corresponding position of the movable core of the receiver R. It will be understood that while I have particularly described the circuit and operation of Figs. 10, 11 and 12 for addition or totalizing, it is equally feasible to so connect the various transmitters in opposed relation as to accomplish the mathematical procedure of subtraction. Furthermore, the design of the inductor unit as to size, travel, number of turns of wire, etc., may readily be accomplished to obtain at the receiver of two or more transmitters. It is not believed necessary to go into detail in connection with these possibilities as they will be clearly apparent to those skilled in the art.

Figs. 13 and 14 are directed to the three-coil inductor unit and wherein Fig. 13 accomplishes the totalizing at the receiver Z of the two transmitter positions X and Y. Fig. 14 subtracts the position of X and Y to give a positive or negative resultant upon the receiver Z. The addition in connection with the units of Fig. 13 is accomplished as follows:

$$E_x = e_x - e_x'$$
$$E_y = e_y - e_y'$$
$$E_0 = e_0 - e_0'$$
$$e_x = E_0 + \Delta e x$$
$$e_x' = E_0 - \Delta e x$$
$$E_x = e_x - e_x' = 2\Delta e x$$

Also $$E_y = 2\Delta e y$$
$$E_x + E_y = 2\Delta e(x+y)$$

and $$e_0 = E_0 + \Delta e z$$
$$e_0' = E_0 - \Delta e z$$
$$E_0 = e_0 - e_0' = 2\Delta e z$$

At balance $$e_b = 0$$

And $$E_x + E_y = E_0$$
$$Z = x + y$$

It is of course apparent that the primary windings of the transmitters of Figs. 13 and 14 may be connected in series instead of in parallel if desired.

While I have chosen to illustrate and describe preferred embodiments of my invention it will be appreciated that many modifications and changes may be made without departing from the scope and intent of the invention. For example, the transmitting core or cores may be positioned in accordance with any variable or position.

What I claim as new and desire to secure by Letters Patent of the United States is:

1. A telemetric system, comprising in combination, a primary and a secondary circuit magnetically coupled at a first and a second location, a source of alternating current for energizing said primary circuit, a primary winding at each of said locations connected in the primary circuit, a pair of secondary windings at each of said locations, each pair of secondary windings connected in series bucking relation and in series loop in said secondary circuit, means responsive to the magnitude of a variable for varying the magnetic coupling between the primary winding and the pair of secondary windings at said first location to thereby set up a potential difference in said secondary circuit between said first and second locations, and electromagnetic means responsive to said potential difference.

2. A telemetric system including, in combination, a primary circuit, a secondary circuit, a source of alternating current for energizing said primary circuit, means normally magnetically coupling said circuits at a first point and a second point so that equal voltages are induced in said secondary circuit at said points and said secondary circuit is in balance, said coupling means comprising a primary winding connected in said primary circuit and a pair of secondary windings connected in series bucking in said secondary circuit, means including a core piece positionable relative to said windings for varying the magnetic coupling at said first point, means responsive to the magnitude of a variable for positioning said core piece to vary the magnetic coupling so as to produce a potential in said secondary circuit having a phase relative to the phase of the alternating current source depending upon the sense of change in the magnitude of the variable, a pair of electron discharge devices each having a cathode, a grid and a plate, a source of alternating current for energizing the plate circuits of said devices, said plates arranged to have opposite polarity, means coupling said secondary circuit to the grids of said electron discharge devices so that one or the other of said devices is rendered conducting depending upon the phase of the potential in said secondary circuit, and means controlled by the current in the plate circuits of said devices for varying the magnetic coupling between said primary and secondary circuits at said second point to rebalance said secondary circuit.

3. The system of claim 2 wherein the last mentioned means comprises a motor having opposed windings which when energized effect operation of said motor in opposite directions, means coupling each of said windings with the plate circuit of one of said devices so that said motor is operated in one direction or the other in accordance with which one of said devices is rendered conducting, and means actuated by said motor for varying the magnetic coupling at said second point to rebalance said secondary circuit.

4. A telemetric system including, in combination, a primary circuit, a secondary circuit, a source of alternating current for energizing said primary circuit, means normally magnetically coupling said circuits at a first point and a second point so that equal voltages are induced in said secondary circuit at said points and said secondary circuit is in balance, said coupling means comprising a primary winding connected in said primary circuit and a pair of secondary windings connected in series bucking in said secondary circuit, means including a core piece positionable relative to said windings for varying the magnetic coupling at said first point, means responsive to the magnitude of a variable for positioning said core piece to vary the magnetic coupling so as to produce a potential in said secondary circuit having a phase relative to the phase of the alternating current source depending upon the sense of change in the magnitude of the variable, a pair of electron discharge devices, means for selectively rendering one or the other of said devices conducting in accordance with the phase of the potential in said secondary circuit, and means for varying the magnetic coupling between said circuits at said second point, said last mentioned means operated in one direction when one of the said electron discharge devices is rendered conducting and in the opposite direction when the other of said electron discharge devices is rendered conducting to thereby vary the magnetic coupling between said circuits at said second point so that the potential induced thereat in the secondary circuit is again made equal to that induced at said first point.

5. A telemetric control system comprising in combination, a first and a second set of relatively fixed windings, each set of windings comprising a primary winding magnetically coupled to a pair of opposed secondary windings, circuit means connecting the respective secondary windings in series, a movable core member for each set of windings, said core members being longitudinally movable along the axes of the windings of the respective sets, a source of alternating current for energizing the primary windings of each of said sets of windings, means for moving the core member of said first set of windings longitudinally of the axes thereof for varying the magnetic coupling between the primary and secondary windings thereof, and receiver means selectively responsive directionally in accordance with the phase of the effective voltage in the circuit connecting the secondary windings to shift the core member of the second set of windings to alter the magnetic coupling therebetween to thereby bring the voltage induced in the secondary windings of said second set of windings into equality with the voltage induced in the secondary windings of the first set of windings.

6. A telemetric control system comprising in combination, a first and a second set of windings each set comprising a primary winding magnetically coupled to a plurality of secondary windings, a source of alternating current for energizing the primary winding of each of said sets of windings, means responsive to the magnitude of a variable for varying the magnetic coupling between the primary and secondary windings of one of said sets of windings, means responsive to a second variable dependent on the first for varying the magnetic coupling between the primary and secondary windings of the other of said sets of windings, means responsive to the difference in the voltages induced in the secondary windings of said sets of windings and selectively operated in accordance with the phase of said voltage difference for bringing the value of said second variable into a predetermined relation with the first variable, said last mentioned means comprising a pair of electron discharge devices each having a cathode, a grid and a plate, a source of alternating current for energizing the plate circuits of said devices, said plates arranged to have opposite polarity, and means for simultaneously impressing on the grid electrodes a common biasing potential varying in magnitude and phase in response to variations in magnitude and phase, respectively, of the effective voltage in said secondary windings so that one or the other of said electron discharge devices is rendered conducting depending upon the phase of the effective voltage in said secondary windings.

7. A mutual inductor totalizing system, comprising in combination, a plurality of transmitters each including a primary and a secondary winding, a receiver totalizer having similar primary and secondary windings, a source of alternating current, all of said primary windings connected across said source, a secondary loop circuit in which all of said secondary windings are connected in series, a core piece associated with each set of primary and secondary windings and adapted to be positioned relative the related windings to vary the magnetic coupling between the primary and secondary windings of each set, means in connection with each transmitter to position its core piece representative of the value of a variable, and means responsive to unbalance of the secondary circuit adapted to position the receiver core piece to vary the magnetic coupling between the primary and secondary windings of the receiver and thereby rebalance the secondary circuit.

8. A totalizing system for continuously adding the values of a plurality of variables including in combination, a transmitter for each of the variables, a receiver totalizer, each of the transmitters and the receiver having a primary winding and a pair of secondary windings and a core piece movable relative the said windings, means responsive to the variable positioning the related core piece, a primary circuit including all of the primary windings and energized by a source of alternating current, a secondary circuit including the secondary windings, each pair of secondary windings included in the secondary circuit in series bucking relation to each other, electronic means sensitive to voltage and phase of the secondary circuit, and a motor controlled by the electronic means adapted to position the receiver core piece in direction to balance the secondary circuit, the position of the receiver core piece representative of the summation of the variables.

9. A totalizing system for continuously adding the values of a plurality of variables including in combination, a transmitter for each of the variables, a receiver totalizer, each of the transmitters and the receiver having a primary winding and an independent secondary winding, a core piece for and movable relative to each transmitter and receiver windings, means responsive to each variable positioning the related core piece, a primary circuit including all of the primary windings and energized by a single source of alternating current, a secondary circuit including all of the secondary windings in series, electronic means sensitive to voltage and phase of the secondary circuit, and motor means controlled by the electronic means adapted to so position the receiver core piece as to balance the secondary circuit, the position of the receiver core piece then being representative of the summation of the variables.

10. A system for remotely establishing a measurement, or a control effect representative of a measurement, of a variable position or value, including in combination; a transmitter comprising a movable core transformer having a primary and two secondary windings and a movable core positionable relative the three windings in accordance with the variable to adjust the relative induced potentials in the two secondaries; a receiver comprising a movable core transformer having a primary and two secondary windings and a movable core positionable relative the three windings to adjust the induced potentials in the two secondaries; a source of alternating current for the said primary windings; the said secondary windings all in series loop circuit; a motor for positioning the receiver movable core; electron discharge means sensitive to induced potential conditions in said loop circuit adapted to control the motor; and means also positioned by the motor adapted to establish a control effect representative of the value of the variable.

11. Apparatus for continuously obtaining the algebraic summation of the values of a plurality of variables including in combination, similar means in connection with each variable responsive to the variable for positioning a movable magnetic core relative a primary and a secondary winding, a receiver means having a magnetic core positionable relative a primary winding and a secondary winding, a primary circuit including the primary windings and energized by a source of alternating current, a secondary circuit including the secondary windings in series, means sensitive to unbalance of the secondary circuit, and a motor responsive to said last means and adapted to position the receiver core to restore the secondary circuit to balance, the position of the receiver core being representative of the algebraic summation of the values of the variables.

12. Apparatus for continuously interrelating the values of a plurality of variables including in combination, similar means in connection with each variable responsive to the variable for positioning a movable magnetic coupling member relative a primary and a secondary winding, a receiver means having a magnetic coupling member positionable relative a primary winding and a secondary winding, a primary circuit including the primary windings and energized by a source of alternating current, a secondary circuit including the secondary windings in series, means sensitive to unbalance of the secondary circuit, and a motor responsive to said last means and adapted to position the receiver magnetic coupling member to restore the secondary circuit to balance, the position of the receiver coupling member being representative of the relation of the separate values of the variables.

13. Apparatus for continuously obtaining the algebraic summation of the values of a plurality of variables including in combination, similar means in connection with each variable responsive to the variable for positioning a movable magnetic coupling member relative a primary winding and a pair of secondary windings, a receiver means having a movable magnetic coupling member positionable relative a primary winding and a pair of secondary windings, a primary circuit including the primary windings and energized by a source of alternating current, a secondary circuit including the secondary windings in series, means sensitive to unbalance of the secondary circuit, and a motor responsive to said last means and adapted to position the receiver coupling member to restore the secondary circuit to balance, the position of the receiver coupling member being representative of the algebraic summation of the values of the variables.

14. Apparatus for continuously interrelating the values of a plurality of variables including in combination, similar means in connection with each variable responsive to the variable for positioning a movable magnetic coupling member relative a primary and a pair of secondary windings, a receiver means having a magnetic coupling member positionable relative a primary winding and a pair of secondary windings, a primary circuit including the primary windings and energized by a source of alternating current, a secondary circuit including the secondary windings in series, means sensitive to unbalance of the secondary circuit, and a motor responsive to said last means and adapted to position the receiver coupling member to restore the secondary circuit to balance, the position of the receiver coupling member being representative of the relation of the separate values of the variables.

15. Apparatus for continuously averaging the values of two variables including in combination, means responsive to a first variable positioning a movable magnetic coupling member relative a primary winding and a pair of secondary windings, means responsive to a second variable positioning a movable magnetic coupling member relative a primary winding and a pair of secondary windings, a receiver means having a movable magnetic coupling member positionable relative a primary winding and a pair of secondary windings, a primary circuit including the primary windings and energized by a source of alternating current, a secondary circuit including the secondary windings, means sensitive to phase and magnitude of unbalance potential in the secondary circuit, and a motor responsive to said last means and adapted to position the receiver coupling member to restore the secondary circuit to balance, the position of the receiver coupling member representative of the average of the first and second variables.

ANTHONY J. HORNFECK.

REFERENCES CITED

The following references are of record in the file of this patent:

UNITED STATES PATENTS

| Number | Name | Date |
|---|---|---|
| 1,973,279 | Bernarde | Sept. 11, 1934 |
| 2,285,540 | Stein et al. | June 9, 1942 |
| 2,275,317 | Ryder | Mar. 3, 1942 |
| 2,062,110 | Swartout | Nov. 24, 1936 |
| 2,025,774 | Rennick et al. | Dec. 31, 1935 |
| 1,448,402 | Hayes | Mar. 13, 1923 |
| 2,164,728 | Wey | July 4, 1939 |
| 2,354,365 | Crossley | July 25, 1944 |
| 2,230,945 | Hansell | Feb. 4, 1941 |
| 2,322,498 | Zeitlin | June 22, 1943 |

FOREIGN PATENTS

| Number | Country | Date |
|---|---|---|
| 693,274 | France | Nov. 1930 |
| 34,500 | Denmark | May 11, 1925 |